(12) United States Patent
Fukami et al.

(10) Patent No.: US 8,403,406 B2
(45) Date of Patent: Mar. 26, 2013

(54) DEFLECTOR APPARATUS FOR VEHICLE

(75) Inventors: Kiyozumi Fukami, Chiryu (JP);
Hiroyuki Ida, Okazaki (JP); Satoshi Isobe, Aichi-ken (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/137,534

(22) Filed: Aug. 24, 2011

(65) Prior Publication Data
US 2012/0248828 A1   Oct. 4, 2012

(30) Foreign Application Priority Data
Mar. 29, 2011   (JP) .................. 2011-073131

(51) Int. Cl.
*B60J 7/22*   (2006.01)
(52) U.S. Cl. ..................................... 296/217
(58) Field of Classification Search .............. 296/217
See application file for complete search history.

(56) References Cited

U.S. PATENT DOCUMENTS

| 6,705,673 | B1 * | 3/2004 | Sorensen et al. ........... 296/217 |
| 6,834,914 | B2 | 12/2004 | Bohm et al. |
| 2008/0067839 | A1 | 3/2008 | Staltmayer |
| 2008/0284211 | A1 | 11/2008 | Oerke et al. |

FOREIGN PATENT DOCUMENTS

| DE | 3922940 | * | 7/1990 |
| EP | 0 787 612 A1 | | 8/1997 |
| EP | 1 745 965 A2 | | 1/2007 |

* cited by examiner

*Primary Examiner* — Dennis Pedder
(74) *Attorney, Agent, or Firm* — Finnegan, Henderson, Farabow, Garrett & Dunner, LLP (57) ABSTRACT

A deflector apparatus for a vehicle including a fixed frame provided at the roof portion, a movable frame positioned at an upper side of the fixed frame and being rotatable between a raised position and a retracted position, a mesh member connected to the fixed frame and the movable frame and brought to a raised state and a retracted state by a rotation of the movable frame, the mesh member extending above a surface of the roof portion in the raised state, and a spring member biasing the movable frame to the raised position. The fixed frame includes a connecting portion connected to the mesh member and provided at an upper side of a drain portion that is formed along a front-inner periphery of the opening. The connecting portion is arranged to have a clearance relative to the drain portion.

2 Claims, 6 Drawing Sheets

DEFLECTOR APPARATUS FOR VEHICLE

CROSS REFERENCE TO RELATED APPLICATIONS

This application is based on and claims priority under 35 U.S.C. §119 to Japanese Patent Application 2011-073131, filed on Mar. 29, 2011, the entire content of which is incorporated herein by reference.

TECHNICAL FIELD

This disclosure generally relates to a deflector apparatus for a vehicle.

BACKGROUND DISCUSSION

A known deflector apparatus for a vehicle is disclosed in DE19603670 (hereinafter referred to as Reference 1), for example. The deflector apparatus (wind deflector) disclosed in Reference 1 is mounted at a front edge of a roof opening formed at a vehicle roof. In a case where a movable panel in a sliding roof system for opening and closing the roof opening is opened, the deflector apparatus is raised above the vehicle roof. The deflector apparatus includes a fixed frame extending along the front edge of the roof opening and fixed to a mounting frame extending along the front edge of the roof opening. The deflector apparatus further includes a movable frame rotatably connected to the fixed frame via a pivot device so as to be movable between a retracted position and a raised position. The movable frame is biased into the raised position by a resilient member. Further, a flexible textile or plastics sheet having flexibility and air-permeable properties is disposed between the fixed frame and the movable frame. The flexible textile is stretched when the movable frame is transferred into the raised position so as to be raised above the vehicle roof together with the movable panel. The flexible textile decreases an aerial vibration (i.e., a wind throb) generated when wind enters the roof opening of the vehicle roof.

The vehicle roof may be formed with a drain portion for discharging water along the front edge of the roof opening. In a case where the drain portion and the deflector apparatus are arranged side by side in the longitudinal direction of the vehicle as in Reference 1, a space for the roof opening at the vehicle roof may be reduced within a predetermined space of the sliding roof system in the longitudinal direction of the vehicle.

A need thus exists for a deflector apparatus for a vehicle which is not susceptible to the drawback mentioned above.

SUMMARY

According to an aspect of this disclosure, a deflector apparatus for a vehicle for arrangement along a front-inner periphery of an opening formed in a roof portion of the vehicle, the deflector apparatus includes a fixed frame provided at the roof portion, a movable frame positioned at an upper side of the fixed frame and being rotatable between a raised position and a retracted position, a mesh member connected to the fixed frame and the movable frame and brought to a raised state and a retracted state by a rotation of the movable frame, the mesh member extending above a surface of the roof portion in the raised state, and a spring member biasing the movable frame to the raised position. The fixed frame includes a connecting portion connected to the mesh member and provided at an upper side of a drain portion that is formed along the front-inner periphery of the opening. The connecting portion is arranged to have a clearance relative to the drain portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
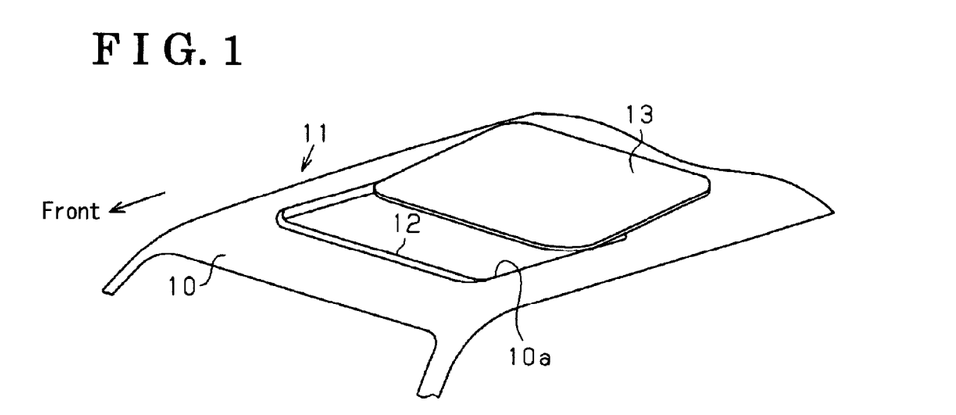
FIG. 1 is a perspective view of a roof where a deflector according to an embodiment is mounted.

An embodiment will be explained with reference to the attached drawings. In the embodiment, directions and orientations such as left, right, front, rear, top, and bottom correspond to those of a vehicle where a deflector apparatus for a vehicle is mounted. As illustrated in FIG. 1, a roof 10 serving as a roof portion of a vehicle, for example, includes a roof opening 10a serving as an opening and substantially having a rectangular shape. A sunroof apparatus 11 mounted at the roof 10 includes a deflector 12 arranged and supported at a front edge (a front-inner periphery) of the roof opening 10a. The deflector 12 serves as a deflector apparatus for a vehicle. The sunroof apparatus 11 also includes a movable panel 13 substantially having a rectangular shape and formed by a glass plate, for example. The movable panel 13 moves in a longitudinal direction of the vehicle to thereby open and close the roof opening 10a.

The deflector 12 attached to the roof 10 rotates relative to a rear portion of the deflector 12 to thereby move a front portion upward, i.e., the deflector 12 is tiltable in an upward direction. The deflector 12 is tilted up by being released from the movable panel 13 when the movable panel 13 performs an opening operation to thereby extend above an upper surface of the roof 10 (i.e., the deflector 12 is brought into a raised state or position). On the other hand, the deflector 12 is pressed down by the movable panel 13 when the movable panel 13 performs a closing operation to be thereby retracted below the upper surface of the roof 10 (i.e., the deflector 12 is brought into a retracted state or position). The deflector 12 is brought into the raised position in a case where the roof opening 10a is opened, thereby inhibiting an aerial vibration (a wind throb) caused by a wind intrusion into a vehicle interior.

The movable panel 13 attached to the roof 10 rotates relative to a front portion of the movable panel 13 to thereby move a rear portion upward, i.e., the movable panel 13 is tiltable in the upward direction and is slidable in the longitudinal direction of the vehicle. In a case where the movable panel 13 performs the opening and closing operation, the movable panel 13 is sliding in the tilted-up state. That is, an outer sliding type is applied to the sunroof apparatus 11 according to the present embodiment.

Figure 2:
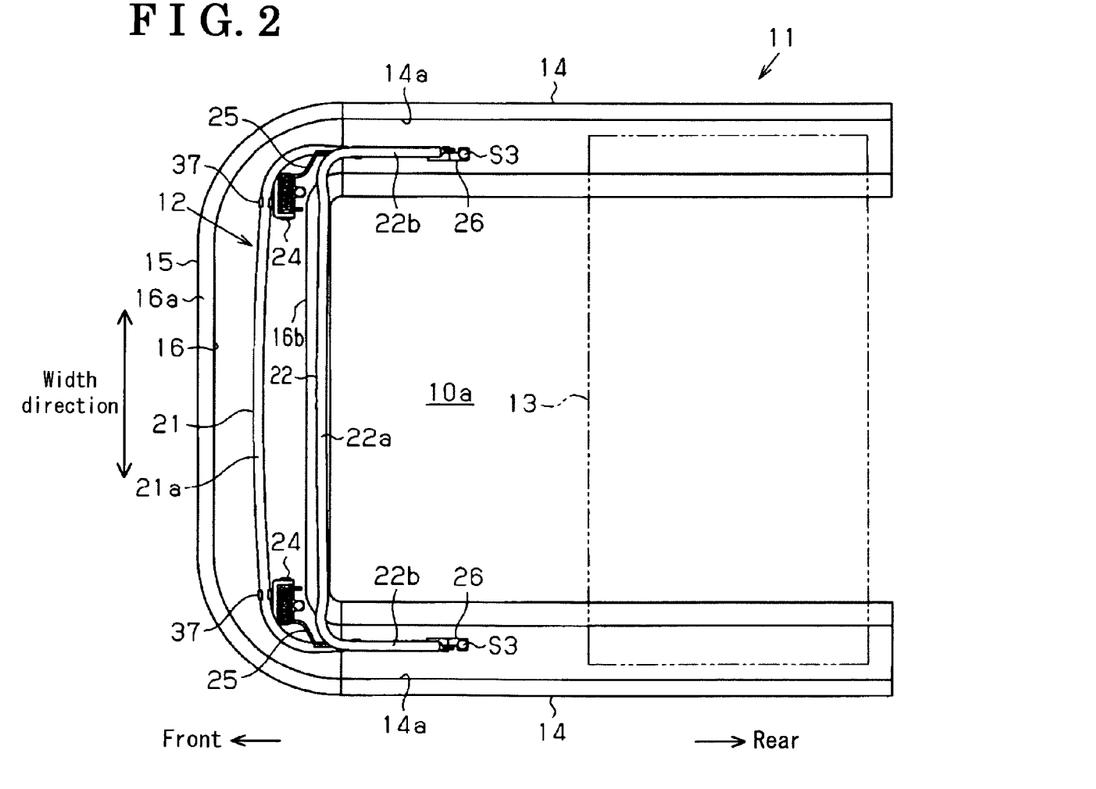
FIG. 2 is a plan view schematically illustrating a sunroof apparatus where the deflector is mounted.

As illustrated in FIG. 2, the sunroof apparatus 11 includes a pair of guide rails 14 arranged and fixed to both side edges of the roof opening 10a in a width direction of the vehicle. Each of the guide rails 14, which is made of an aluminum alloy extruded material, for example, extends in the longitudinal direction of the vehicle while having a constant cross section in the longitudinal direction. Drive mechanisms are slidably attached to the guide rails 14 respectively so as to drive the movable panel 13 to open and close. Both side edge portions of the movable panel 13 in the width direction of the vehicle are fixed and supported to the drive mechanisms of the guide rails 14 so that the movable panel 13 is arranged therebetween.

Figure 6A:
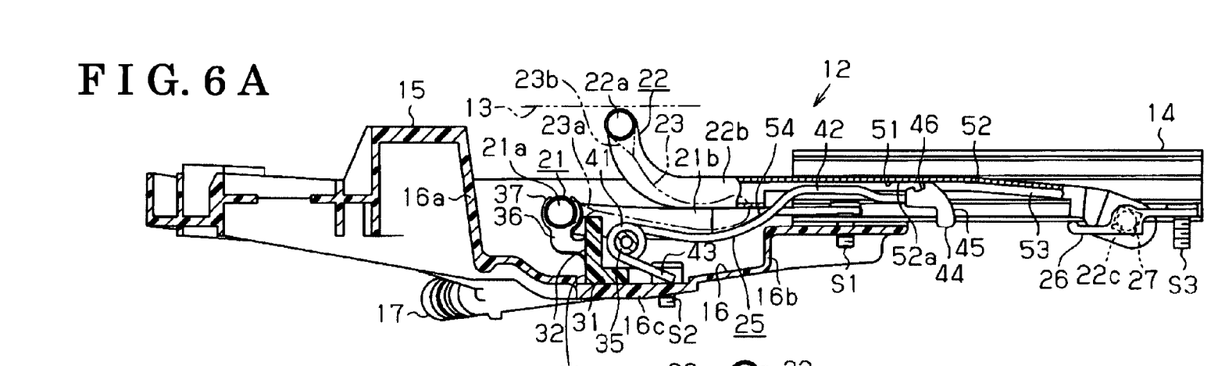
FIG. 6A is a cross-sectional view of the deflector in a retracted position.
Figure 6B:
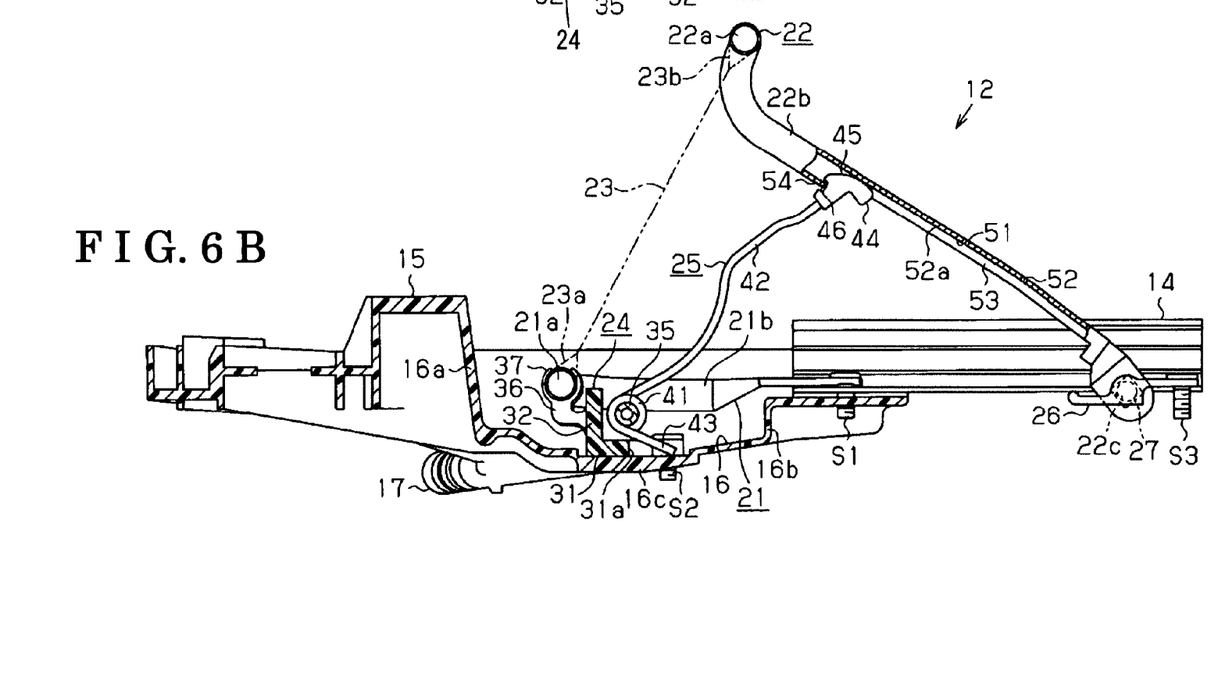
FIG. 6B is a cross-sectional view of the deflector in a raised position.

The sunroof apparatus 11 includes a front housing 15 at the front edge of the roof opening 10a. The front housing 15 made of resin extends in the width direction of the vehicle so as to connect front end portions of the guide rails 14. As illustrated in FIGS. 2 and 6, a drain portion 16 is formed at the front housing 15 so as to extend in the width direction of the vehicle. The drain portion 16 includes a front wall portion 16a, a rear wall portion 16b, and a bottom portion 16c to thereby form a box shape of which an upper side is open. Both end portions of the drain portion 16 in the width direction of the vehicle are bent in a rearward direction of the vehicle so as to face the respective guide rails 14. The front housing 15 is formed into the box shape having an opening at the upper side because of the drain portion 16 to thereby define a storage space for the deflector 12 and to function as a drainage channel around the roof opening 10a. In addition, guide rail drain portions 14a are formed at the respective guide rails 14 so as to extend in the longitudinal direction of the vehicle. The guide rail drain portions 14a are connected to the drain portion 16 of the front housing 15 so that a liquid collected in the guide rail drain portions 14a flows into the drain portion 16. The liquid collected in the drain portion 16 is discharged to the outside from an outlet 17 integrally formed at the front housing 15 as illustrated in FIGS. 6A and 6B.

Figure 3:
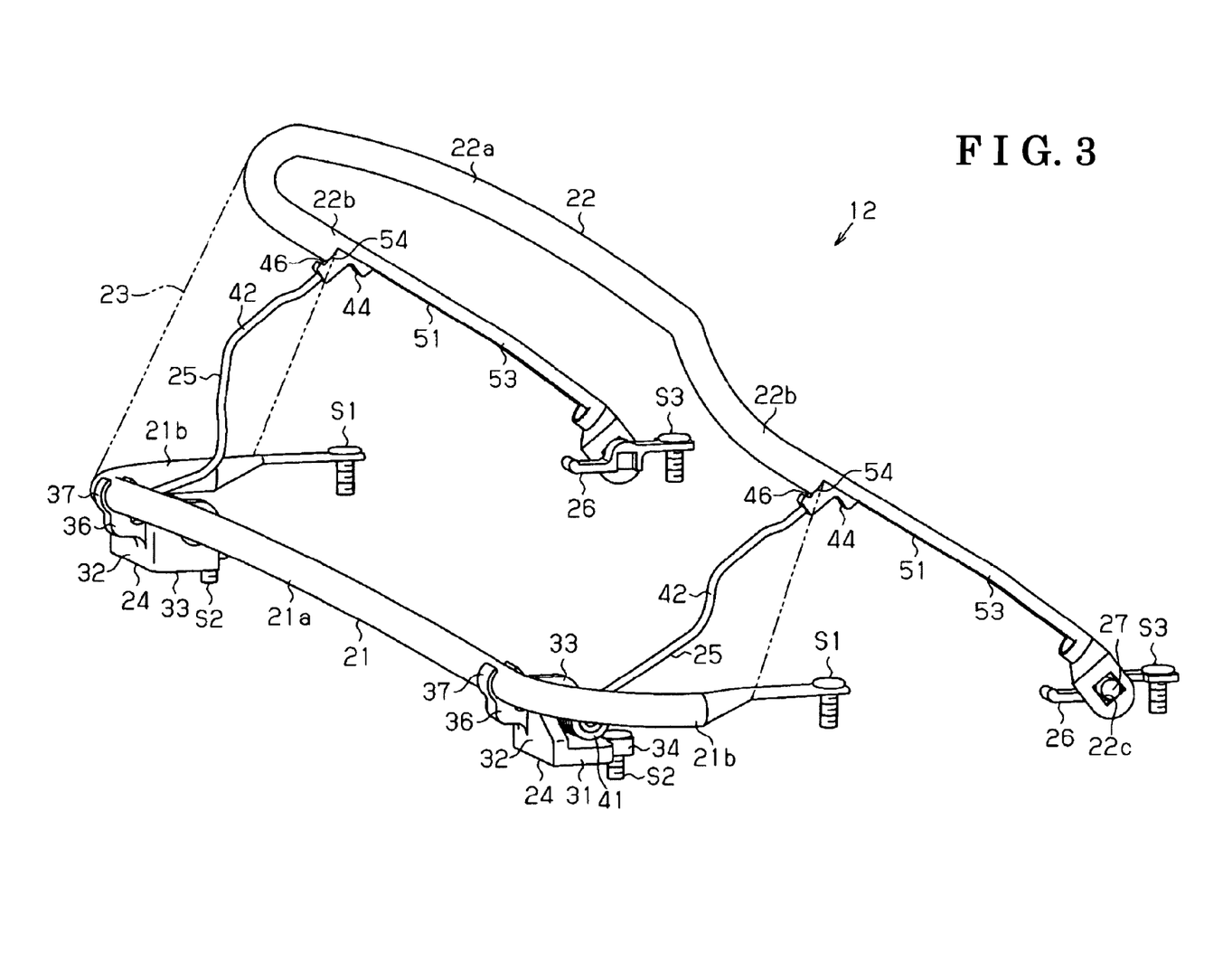
FIG. 3 is a perspective view of the deflector according to the embodiment.

The deflector 12 and a structure to support the deflector 12 will be explained below. As illustrated in FIG. 3, the deflector 12 includes a fixed frame 21 supported by the guide rails 14 and the front housing 15, a movable frame 22 positioned at an upper side of the fixed frame 21, and a mesh member 23 extending between the fixed frame 21 and the movable frame 22. In FIG. 3, an illustration of the mesh member 23 is omitted.

The fixed frame 21 includes a front portion 21a extending in the width direction of the vehicle at an upper side of the drain portion 16 and a pair of side portions 21b connected to both ends of the front portion 21a in the width direction of the vehicle so as to extend in the rearward direction of the vehicle. The front portion 21a of the fixed frame 21 is supported by a pair of holder members 24 fixedly provided in the drain portion 16 of the front housing 15. Rear ends of the side portions 21b are fixed to the guide rails 14 by screws S1 respectively from an upper side.

The holder members 24 are positioned at an inner side in the width direction of the vehicle relative to the respective side portions 21b of the fixed frame 21. Specifically, the holder members 24 are arranged at positions away from a center of the front housing 15 in the width direction so that distances from the center to the respective positions are substantially the same. The holder members 24 have substantially the same configurations so as to be symmetrical with respect to a center line of the front housing 15 in the width direction.

Figure 5A:
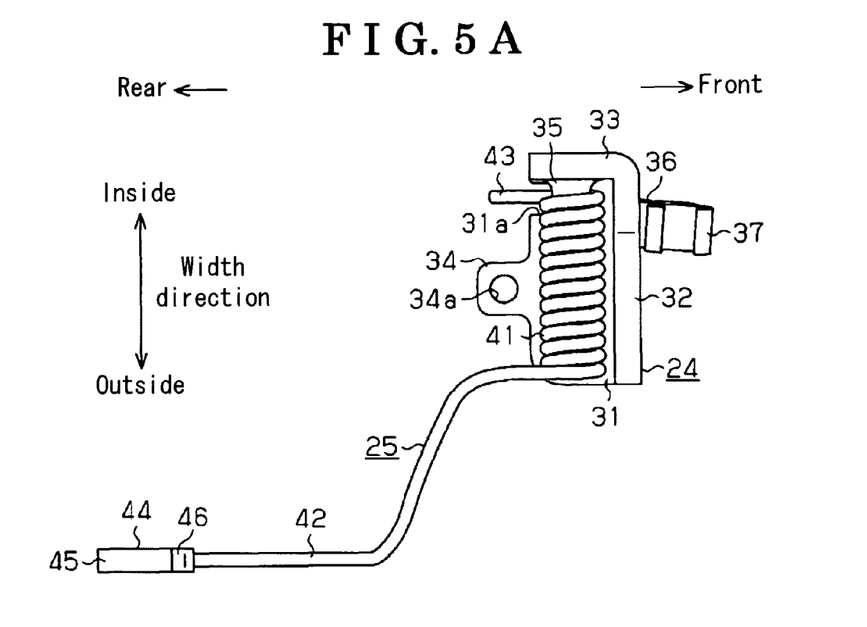
FIG. 5A is a plan view of a holder member and a torsion spring of the deflector.
Figure 5B:
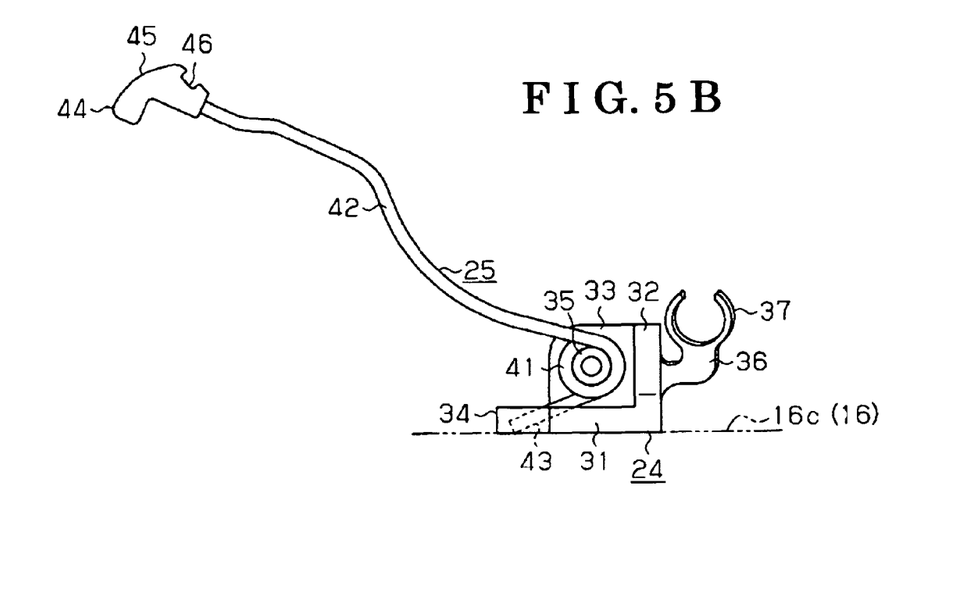
FIG. 5B is a side view of the holder member and the torsion spring.

FIGS. 5A and 5B are a plan view and a side view each illustrating the holder member 24 provided at a left side when viewed from a front of the vehicle, and a torsion spring 25 serving as a spring member attached to the holder member 24. Each of the holder members 24 made of resin integrally includes a plate-shaped base portion 31 in contact with the bottom portion 16c of the drain portion 16, a front wall portion 32 extending upward from a front edge of the base portion 31, and an inner wall portion 33 extending upward from an inner edge of the base portion 31. The holder member 24 further includes a protruding portion 34 extending rearward from a center of the base portion 31 in the width direction. The protruding portion 34 includes a screw insertion bore 34a penetrating in a vertical direction of the vehicle. Screws S2 inserted into the screw insertion bores 34a of both the holder members 24 as illustrated in FIG. 3 are tightened and fixed to the drain portion 16 of the front housing 15.

Each of the holder members 24 includes a spring support column 35 connected to the inner wall portion 33 and extending outwardly in the width direction of the vehicle so as to be positioned at an upper side of the base portion 31. The spring support column 35 serves as a spring support portion and substantially has a cylindrical shape in a cross section. A length of the spring support column 35 in the width direction of the vehicle is substantially equal to a length of the base portion 31 in the width direction of the vehicle. The spring support column 35 includes an inner end portion in the width direction serving as a fixed end, and an outer end portion in the width direction serving as a free end to thereby support the torsion spring 25 in a cantilever manner.

Each of the holder members 24 also includes an extending portion 36 extending forward from the front wall portion 32 and bending upward to be thereby substantially formed into an L-shape, and a grip portion 37 serving as a frame support portion and formed at an end of the extending portion 36 into an arc shape. The grip portion 37 has a shape where an upper side of a cylinder penetrating substantially in the width direction of the vehicle is open. The front portion 21a of the fixed frame 21 is assembled on the grip portion 37 from an upper side. The front portion 21a of the fixed frame 21 is held at the grip portion 37 accordingly.

A positional relationship between the drain portion 16 of the front housing 15 and the fixed frame 21 will be explained below. The fixed frame 21 is positioned at the upper side of the bottom portion 16c of the drain portion 16 and is supported by the holder members 24 provided on the bottom portion 16c so as to have a clearance relative to the bottom portion 16c of the drain portion 16. That is, at least a portion of the fixed frame 21 overlaps the drain portion 16 in the longitudinal direction of the vehicle, which may lead to an enlarged space for the roof opening 10a in the longitudinal direction compared to a case where the fixed frame 21 and the drain portion 16 are arranged side by side in the longitudinal direction.

In addition to the fixed frame 21 as mentioned above, the torsion springs 25 biasing the movable frame 22 are also supported by the respective holder members 24. Each of the torsion springs 25 is made of a wire rod substantially having a circular shape in a cross section. A coil portion 41 of the torsion spring 25 is arranged around the support column 35 of the holder member 24. That is, an axis of the coil portion 41 is substantially parallel to an axis of the spring support column 35. At a time of assembly, the coil portion 41 is attached to the spring support column 35 from the free end thereof.

One end coil portion pulled from an outer end of the coil portion 41 in the width direction of the vehicle extends rearward to form an arm portion 42. The other end coil portion pulled from an inner end of the coil portion 41 in the width direction forms an engagement end portion 43 engaging with the bottom portion 16c of the drain portion 16 via a cut portion 31a formed at the base portion 31 of the holder member 24. Because the engagement end portion 43 of the torsion spring 25 is engaged from a lower side with the bottom portion 16c of the drain portion 16, the arm portion 42 is biased upwardly. The arm portion 42 is sufficiently longer than the engagement end portion 43 and is bent at a middle portion outwardly in the width direction as illustrated in FIG. 5A.

As illustrated in FIGS. 5A and 5B, a sliding member 44 serving as a sliding portion and made of resin is fixedly provided at an end of each of the arm portions 42. The sliding member 44 includes a sliding surface 45 formed to curve substantially in a rotation direction of the arm portion 42 relative to the axis of the spring support column 35 when viewed from a side (see FIG. 5B). The sliding surface 45 is formed into a planar shape in the width direction of the vehicle. The sliding member 44 also includes an engagement recess portion 46 serving as an engagement portion.

The movable frame 22 includes a front portion 22a extending in the width direction of the vehicle and a pair of side portions 22b connected to both ends of the front portion 22a in the width direction and extending rearward. Rear ends of the side portions 22b of the movable frame 22 are rotatably supported by support members 26 fixed to the guide rails 14 respectively. Specifically, the support members 26 include rotation shafts 27 extending outwardly in the width direction so as to be inserted into connection bores 22c formed at the respective rear ends of the side portions 22b of the movable frame 22. Accordingly, the movable frame 22 is configured to be rotatable relative to the rotation shafts 27 at the rear ends of the side portions 22b so that the front portion 22a moves upward and downward. The support members 26 are fixed to the guide rails 14 by means of screws S3 respectively from an upper side.

Figure 4A:
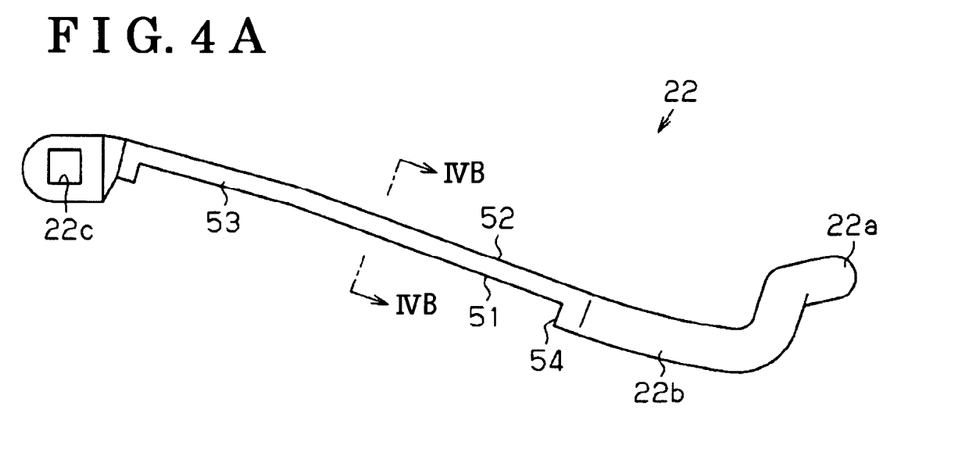
FIG. 4A is a side view of a movable frame of the deflector.
Figure 4B:
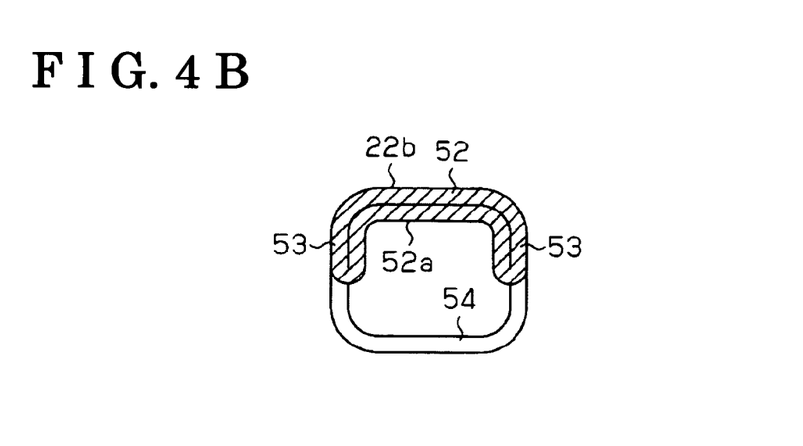
FIG. 4B is a cross-sectional view taken along the line IVB-IVB in FIG. 4A.

As illustrated in FIGS. 4A and 4b, a guide groove 51 is formed at a lower side surface (facing the fixed frame 21) of the side portion 22b of the movable frame 22 so as to extend in the longitudinal direction of the side portion 22b. The guide groove 51 includes an upper bottom portion 52 extending in the longitudinal direction of the side portion 22b and a pair of side wall portions 53 extending downwardly from both edges of the upper bottom portion 52 in the width direction of the vehicle. The side wall portions 53 extend in the longitudinal direction of the side portion 22b. A lower side surface 52a formed at the upper bottom portion 52 includes a sliding surface having a planar shape and being slidable with the sliding member 44 formed at the torsion spring 25. As illustrated in FIG. 4B, each of the guide grooves 51 is substantially formed into a U-shape in a cross section opening downwardly by the upper bottom portion 52 and the side wall portions 53.

The movable frame 22 is formed by a metallic member having a circular hollow shape. A slit is formed at an appropriate position of the metallic member within a range corresponding to each of the side portions 22b to thereby define a predetermined portion at an end side relative to the slit. The predetermined portion is press-worked so as to form the guide groove 51. In addition, a portion of the metallic member defined by the slit not being press-worked forms an engagement portion 54 engageable with the engagement recess portion 46 of the sliding member 44. As illustrated in FIG. 4B, a cylindrical portion including the engagement portion 54 of each of the side portions 22b is substantially formed into a square shape in a cross section.

Each of the sliding members 44 attached to the torsion spring 25 is fitted to the guide groove 51. The sliding surface 45 of the sliding member 44 makes contact thoroughly in the width direction thereof with the lower side surface 52a of the upper bottom portion 52 of the guide groove 51. Thus, the biasing force of the torsion spring 25 acting upwardly in the moving or rotation direction thereof relative to the coil portion 41 (i.e., an upward biasing force) is applied from the arm portion 42 to each of the side portions 22b of the movable frame 22 via the sliding member 44. In addition, the engagement recess portion 46 of the sliding member 44 is formed to open to the engagement portion 54 of the side portion 22b of the movable frame 22 so as to be engageable with the engagement portion 54.

The mesh member 23 is made of a cloth having flexibility and permeability. A lower end portion 23a of the mesh member 23 is connected to the fixed frame 21 in such a manner to be wound by the front portion 21a and a portion of the side portions 21b of the fixed frame 21. In addition, an upper end portion 23b of the mesh member 23 is connected to the movable frame 22 in such a manner to be wound by the front portion 22a and a portion of the side portions 22b of the movable frame 22.

An operation of the deflector 12 according to the embodiment will be explained with reference to FIGS. 6A and 6B. In a closed state of the movable panel 13 as illustrated in FIG. 6A, a portion of the movable panel 13 is positioned above the deflector 12. In this state, the movable frame 22 of the deflector 12 receives the biasing force of the arm portion 42 of the torsion spring 25 so that the front portion 22a makes contact with the movable panel 13. That is, the biasing force of the torsion spring 25 is received by the movable panel 13 via the movable frame 22. Therefore, the movable frame 22 is brought in the retracted state. At this time, the mesh member 23 of the deflector 12 is retracted in a state to be deflected in the rearward direction of the vehicle from connected portions with the fixed frame 21 and the movable frame 22.

In a state where the movable panel 13 is slid in the rearward direction of the vehicle from the aforementioned closed state, the movable frame 22 is released from the movable panel 13. Then, the both side portions 22b of the movable frame 22 receive the upward biasing force in the rotation direction relative to the coil portions 41 of the torsion springs 25 from the arm portions 42 via the sliding members 44 so that the movable frame 22 moves (rotates) upwardly relative to the rotation shafts 27. In a case where the movable frame 22 is moving (rotating), each of the sliding members 44 of the arm portions 42 moves towards the front portion 22a of the movable frame 22 along the guide groove 51 in a state where the sliding surface 45 of the sliding member 44 is slidably in contact with the upper bottom portion 52 of the guide groove 51. Then, as illustrated in FIG. 6B, when the engagement recess portion 46 of the sliding member 44 reaches the engagement portion 54 of the guide groove 51 so as to engage therewith, the movable frame 22 is maintained at the raised position where the mesh member 23 is maintained to be stretched taut.

According to the embodiment, the front portion 21a of the fixed frame 21 connected to the lower end portion 23a of the mesh member 23 is arranged above the drain portion 16 of the front housing 15 so as to have the clearance therebetween. Thus, the mesh member 23 is restrained from making contact with water collected in the drain portion 16 when the deflector 12 is in the retracted state.

In addition, in a state where the torsion springs 25 apply the biasing force to the movable frame 22, a reaction force (a moment force) is generated at the coil portions 41 of the torsion springs 25 so as to move or rotate one end portion (facing the arm portion 42) of each of the coil portions 41 downwardly and move or rotate the other end portion of each of the coil portions 41 upwardly. Thus, according to the present embodiment, the end portion of the spring support column 35 of each of the holder members 4 receiving an upward load by the aforementioned moment force (and facing the engagement end portion 43) serves as the fixed end and the opposite end portion facing the arm portion 42 serves as the free end.

In a structure where a wall portion is formed at the outer edge of the base portion 31 in the width direction of the vehicle and the spring support column 35 extends from the wall portion inwardly in the width direction, i.e., where the end portion (the inner end portion) of the spring support column 35 facing the engagement end portion 43 serves as the free end, the free end of the spring support column 35 may be raised upward by the moment force. Thus, a distance between the free end of the spring support column 35 and the bottom portion 16c of the drain portion 16 increases, thereby decreasing the biasing force of the torsion spring 25. On the other hand, according to the present embodiment, the end portion of the spring support column 35 facing the engagement end portion 43 serves as the fixed end to thereby restrain the end portion from being raised up. As a result, the decrease of the biasing force of each of the torsion springs 25 is restrained.

Further, the deflector 12 according to the present embodiment is tightened and fixed from the upper side by means of the screws S1, S2, and S3, which may lead to an easy assembly and an easy replacement of the deflector 12. In addition, each of the holder members 24 is configured so as to secure both of the fixed frame 21 and the torsion spring 25 relative to the front housing 15. As a result, the deflector 12 may be handled as one assembly. Specifically, in a case of replacing the deflector 12, for example, the screws S1, S2, and S3 are removed first. Then, the fixed frame 21, the movable frame 22, the mesh member 23, the holder members 24, the torsion springs 25, and the support members 26 are handled as the single assembly. Consequently, the assembly and replacement of the deflector 12 may be easily performed.

According to the aforementioned embodiment, the front portion 21a of the fixed frame 21 serving as a connection portion connected to the mesh member 23 is provided above the drain portion 16 that is formed along the front edge of the roof opening 10a while having the clearance relative to the drain portion 16. That is, at least a portion of the fixed frame 21 is arranged so as to overlap the drain portion 16 in the longitudinal direction of the vehicle. Thus, compared to a case where the fixed frame 21 and the drain portion 16 are arranged side by side in the longitudinal direction of the vehicle, a space for the roof opening 10a of the roof 10 is enlarged in the embodiment. In addition, the mesh member 23 is restrained from making contact with liquid such as rainwater in the drain portion 16.

In addition, according to the embodiment, the holder members 24 are arranged between the drain portion 16 and the front portion 21a so as to hold the front portion 21a of the fixed frame 21. Thus, the clearance between the front portion 21a of the fixed frame 21 and the drain portion 16 is stably maintained by the holder members 24.

Further, according to the embodiment, the holder members 24 support both of the fixed frame 21 and the torsion springs 25, thereby restraining an increase of the number of components.

The deflector 12 of the present embodiment includes the fixed frame 21 provided at the roof 10, the movable frame 22 positioned at the upper side of the fixed frame 21 and being rotatable between the raised position and the retracted position, the mesh member 23 connected to the fixed frame 21 and the movable frame 22 and brought to the raised state and the retracted state by a rotation of the movable frame 22, and the torsion spring 25 biasing the movable frame 22 to the raised position. The torsion spring 25 includes the sliding member 44 fitted to the guide groove 51 that is formed at the movable frame 22 and slidably making contact with the guide groove 51 to transmit a biasing force of the torsion spring 25 in a state where the movable frame 22 is rotating. The torsion spring 25 further includes the engagement portion 54 engaging with the movable frame 22 when the movable frame 22 is in the raised position. The movable frame 22 is configured to be maintained at the raised position by the engagement with the engagement portion 54 of the torsion spring 25. Because the movable frame 22 is maintained at the raised position by the engagement with the torsion springs 25, the mesh member 23 is restrained from excessively extending because of the application of the biasing force of the torsion springs 25 relative to the mesh member 23 as in a structure where the mesh member maintains the movable frame at the raised position. Therefore, an increase of wind noise caused by the excessive extension of the mesh member that leads to an increase of the height of the deflector may be restrained. In addition, because positions where the movable frame 22 and the torsion springs 25 engage with one another are not fixed and are slidable (movable), the movable frame 22 is restrained from sliding in the longitudinal direction of the vehicle while rotating. As a result, according to the embodiment, the sunroof apparatus 11 may be downsized and the increase of wind noise may be restrained.

Further, according to the embodiment, the holder member 24 including the spring support column 35 serving as the spring support portion and the grip portion 37 serving as the frame support portion is provided at the inner side in the width direction of the vehicle relative to the outer edge of the fixed frame 21 in the width direction. Accordingly, an enlargement of the deflector 12 in the width direction of the vehicle may be restrained.

Furthermore, according to the embodiment, the spring support column 35 supports the coil portion 41 of the torsion spring 25 in the cantilever manner. Therefore, the coil portion 41 of the torsion spring 25 may be easily assembled on the spring support column 35.

Furthermore, according to the embodiment, the spring support column 35 extends in the width direction of the vehicle and the fixed end of the spring support column 35 is provided at the inner side in the width direction. Therefore, the free end of the spring support column 35 is restrained from being raised up by the reaction force of the torsion spring 25. As a result, a decrease of the biasing force of the torsion spring 25 may be restrained.

Furthermore, according to the embodiment, the sliding portion 44 is made of the resin material. Therefore, a generation of an abnormal noise at a time when the sliding member 44 makes slidable contact with the guide groove 51 may be restrained.

The embodiment may be modified or changed as below. According to the embodiment, the torsion springs 25 are supported by the front housing 15 via the respective holder members 24. Alternatively, the torsion springs 25 may be directly supported by the front housing 15 or the guide rails 14.

In addition, according to the embodiment, the holder members 24 hold the fixed frame 21. Alternatively, the holder members 24 may be omitted so that the fixed frame 21 is held by only the fixation of the respective rear ends of the side portions 21b. Further alternatively, while the holder members 24 are being omitted, the fixed frame 21 may be integrally formed at the front housing 15 or the guide rails 14.

Figure 7:
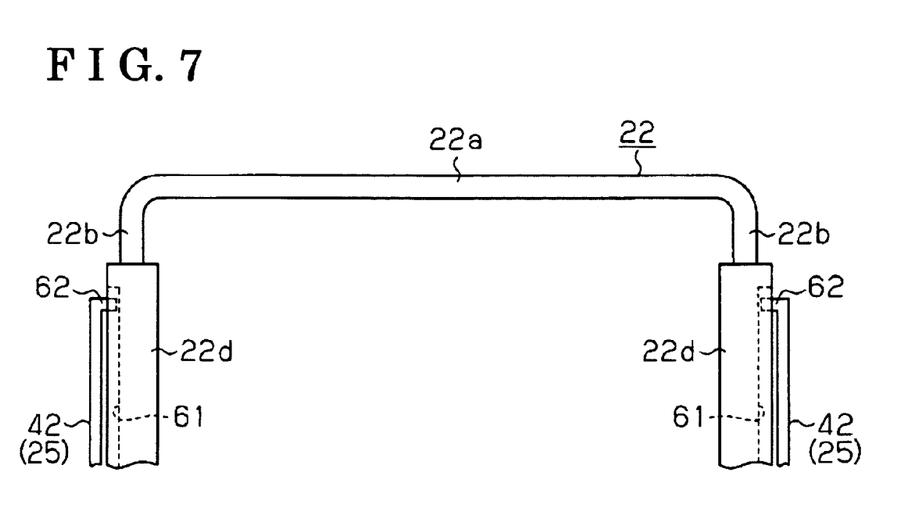
FIG. 7 is a plan view schematically illustrating a movable frame and a torsion spring according to another example of the embodiment.

Configurations of the guide groove 51 and the torsion spring 25 may be appropriately changed or modified. For example, configurations as illustrated in FIG. 7 are applicable. In FIG. 7, an outer periphery of each of the side portions 22b of the movable frame 22 is resin-molded to thereby form a resin-molded portion 22d. Then, a guide groove 61 opening outwardly in the width direction of the vehicle extends in the longitudinal direction of the side portion 22b. An end of the arm portion 42 of the torsion spring 25 is bent inwardly in the width direction of the vehicle to form a bending end portion 62 that is fitted to the guide groove 61. In such configuration, a generation of abnormal noise when the arm portion 42 is slidably connected to the guide groove 61 is restrained. In FIG. 7, the guide groove 61 is formed at the outward side in the width direction of the vehicle. Instead, the guide groove 61 may be formed at the inward side in the width direction of the vehicle. Further, in FIG. 7, the side portion 22b of the movable frame 22 is resin-molded. Instead, a resin material may be provided at an inner side of the guide groove 61.

According to the embodiment, the end portion of the spring support column 35 of the holder member 24 facing the engagement end portion 43 serves as the fixed end while the opposite end portion of the spring support column 35 facing the arm portion 42 serves the free end. Alternatively, the fixed end and the free end may be inversely specified.

Further, according to the embodiment, the torsion spring 25 is used as the spring member to bias the movable frame 22. At this time, the spring member is not limited to the torsion spring 25 and may be an appropriate member other than the torsion spring 25.

Furthermore, the deflector 12 may be raised or retracted by an electrical power in association with the opening and closing operation of the movable panel 13.

According to the aforementioned embodiment, at least a portion of the fixed frame 21 is arranged so as to overlap the drain portion 16 in the longitudinal direction of the vehicle. Thus, compared to a case where the fixed frame 21 and the drain portion 16 are arranged side by side in the longitudinal direction of the vehicle, the space for the roof opening 10a of the roof 10 is enlarged in the longitudinal direction. In addition, because the front portion 21a of the fixed frame 21 connected to the mesh member 23 is provided at the upper side of the drain portion 16 while having the clearance therebetween, the mesh member 23 is restrained from making contact with a liquid such as rainwater within the drain portion 16.

In addition, the deflector 12 of the embodiment further includes the holder member 24 holding the front portion 21a of the fixed frame 21 and being arranged between the drain portion 16 and the front portion 21a.

Accordingly, the clearance between the front portion 21a of the fixed frame 21 and the drain portion 16 is stably maintained by the holder member 24.

Further, according to the embodiment, the holder member 24 supports the torsion spring 25.

Accordingly, the holder member 24 supports both of the fixed frame 21 and the spring member 25, thereby restraining an increase of the number of components.

Furthermore, according to the embodiment, the holder member 24 is provided at the inner side in the width direction of the vehicle relative to the outer edge of the fixed frame 21 in the width direction.

Accordingly, the enlargement of the deflector 12 in the width direction of the vehicle may be restrained.

According to the aforementioned embodiment, the space for the roof opening 10a of the roof 10 is enlarged in the longitudinal direction of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A deflector apparatus for a vehicle for arrangement along a front-inner periphery of an opening formed in a roof portion of the vehicle, the deflector apparatus comprising:
    a fixed frame provided at the roof portion;
    a movable frame positioned at an upper side of the fixed frame and being rotatable between a raised position and a retracted position;
    a mesh member connected to the fixed frame and the movable frame and brought to a raised state and a retracted state by a rotation of the movable frame, the mesh member extending above a surface of the roof portion in the raised state; and
    a spring member biasing the movable frame to the raised position;
    the fixed frame including a connecting portion connected to the mesh member and provided at an upper side of a drain portion that is formed along the front-inner periphery of the opening, the connecting portion being arranged to have a clearance relative to the drain portion;
    wherein the deflector apparatus further comprises a holder member holding the connecting portion of the fixed frame and being arranged between the drain portion and the connecting portion; and
    wherein the holder member supports the spring member.

2. The deflector apparatus according to claim 1, wherein the holder member is provided at an inner side in a width direction of the vehicle relative to an outer edge of the fixed frame in the width direction.

* * * * *